US011435802B2

(12) United States Patent
Savidis et al.

(10) Patent No.: US 11,435,802 B2
(45) Date of Patent: Sep. 6, 2022

(54) WORK LOAD SCHEDULING FOR MULTI CORE SYSTEMS WITH UNDER-PROVISIONED POWER DELIVERY

(71) Applicant: Drexel University, Philadelphia, PA (US)

(72) Inventors: Ioannis Savidis, Wallingford, PA (US); Divya Pathak, Philadelphia, PA (US); Houman Homayoun, Fairfax, VA (US)

(73) Assignee: Drexel University, Philadelphia, PA (US)

( * ) Notice: Subject to any disclaimer, the term of this patent is extended or adjusted under 35 U.S.C. 154(b) by 127 days.

(21) Appl. No.: 15/968,348

(22) Filed: May 1, 2018

(65) Prior Publication Data

US 2018/0314308 A1    Nov. 1, 2018

Related U.S. Application Data

(60) Provisional application No. 62/492,648, filed on May 1, 2017, provisional application No. 62/492,681, filed on May 1, 2017.

(51) Int. Cl.
  *G06F 1/28* (2006.01)
  *G06F 9/50* (2006.01)
  *G06F 1/329* (2019.01)

(52) U.S. Cl.
  CPC ............... *G06F 1/28* (2013.01); *G06F 1/329* (2013.01); *G06F 9/5083* (2013.01)

(58) Field of Classification Search
  CPC ..................................................... G06F 1/28
  See application file for complete search history.

(56) References Cited

U.S. PATENT DOCUMENTS

| | | | |
|---|---|---|---|
| 2007/0220293 A1* | 9/2007 | Takase | G06F 9/30189 713/320 |
| 2008/0067993 A1* | 3/2008 | Coleman | H02M 1/15 323/282 |
| 2012/0159496 A1* | 6/2012 | Dighe | G06F 9/4893 718/102 |
| 2013/0290758 A1* | 10/2013 | Quick | G06F 1/324 713/323 |
| 2015/0177798 A1* | 6/2015 | Venishetti | G06F 1/189 713/300 |

OTHER PUBLICATIONS

Pathak, D., et al., "Load Balanced On-Chip Power Delivery for Average Current Demand," Proceeding GLSVLSI '16 Proceedings of the 26th edition on Great Lakes Symposium on VLSI, pp. 439-444 (2016).

(Continued)

*Primary Examiner* — Kim Huynh
*Assistant Examiner* — Eric Chang
(74) *Attorney, Agent, or Firm* — Schott, P.C.

(57) ABSTRACT

A real-time workload scheduling heuristic assigns tasks to the cores such that the total load current consumption of the cores is always less than the total current capability of the under-provisioned on-chip voltage regulators. In addition, the energy-efficient scheduling of the tasks on to the cores ensures that the reconfiguration of the power delivery network is minimized. The heuristic includes DVFS management based on the unique constraints of the under provisioned voltage regulators.

15 Claims, 15 Drawing Sheets

(56) References Cited

OTHER PUBLICATIONS

Pathak, D., et al., "Smart Grid on Chip: Work Load Balanced On-Chip Power Delivery," IEEE Transactions on Very Large Scale Integration (VLSI) Systems, vol. 25, No. 9, pp. 2538-2551 (2017).
Pathak, D., et al., "Work Load Scheduling for Multi Core Systems With Under-Provisioned Power Delivery," Proceeding GLSVLSI '17 Proceedings of the on Great Lakes Symposium on VLSI 2017, pp. 387-392 (2017).

\* cited by examiner

Table 1

| big core (A15) | LITTLE core (A7) |
|---|---|
| 1800/1.250 | 1200/1.225 |
| 1700/1.200 | 1100/1.125 |
| 1600/1.162 | 1000/1.100 |
| 1500/1.137 | 900/1.037 |
| 1400/1.100 | 800/0.987 |
| 1300/1.062 | 700/0.950 |
| 1200/1.025 | 600/0.950 |
| 1100/1.000 | 500/0.950 |
| 1000/0.962 | 400/0.950 |
| 900/0.925 | 300/0.950 |
| 800/0.900 | 200/0.950 |

Table 2: Parameters of the CMP cores derived from the Samsung Exynos 5410 big.LITTLE architecture.

| Parameter | big core (A15) | LITTLE core (A7) |
|---|---|---|
| Nominal voltage (V) | 1.16 | 1.225 |
| Nominal frequency (MHz) | 1600 | 1200 |
| OCVR maximum current rating ($I_{avg}$ in mA) | 800 | 110 |
| Power model parameters [$\alpha_j$, $\kappa_j$ (mW/MHz$^3$), $\beta_j$ (mW)] | [2.63, 2.91 × 10$^{-6}$, 146.49] | [3.28, 1.00 × 10$^{-5}$, 34.24] |
| Number of cores in homogeneous CMP system | 16 | 0 |
| Number of cores in heterogeneous CMP system | 4 | 4 |

FIG. 2(a)

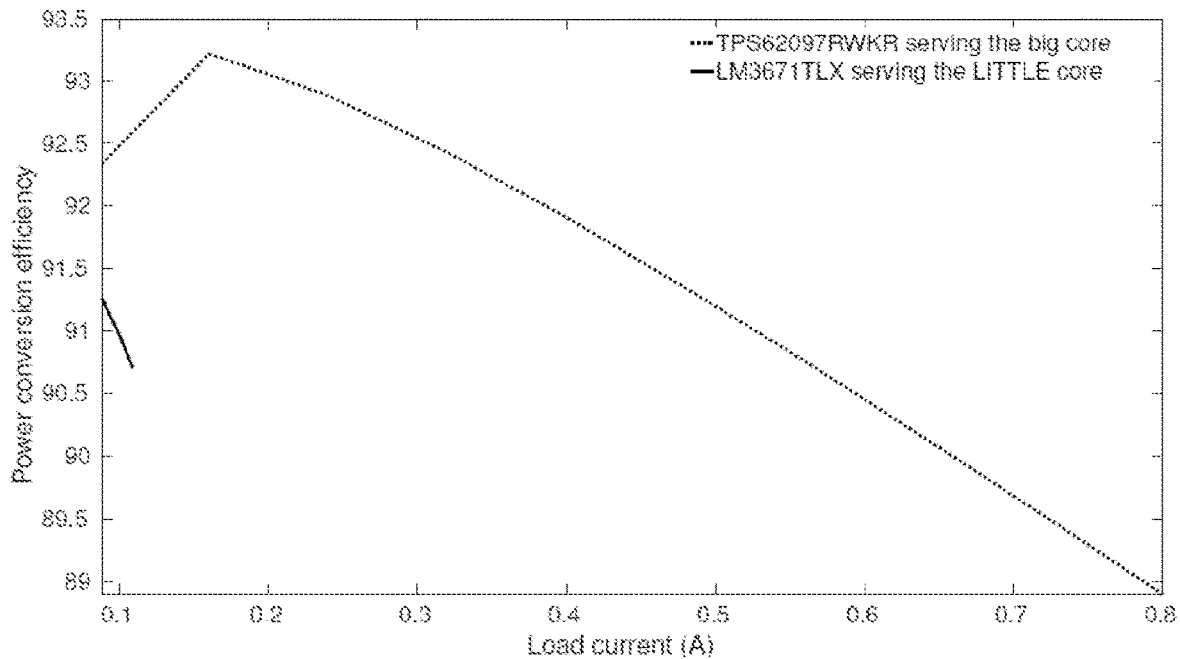

FIG. 3

Table 3: Operating values of the switching DC-DC buck converters [12] serving the ARM A15 and A7 cores.

| Device | LM3671TLX | TPS62097RWKR |
|---|---|---|
| Input voltage (V) | 2.5 | 2.5 |
| Output voltage range (V) | 0.9 to 1.3 | 0.9 to 1.3 |
| Maximum output current (mA) | 110 | 800 |
| Efficiency at maximum output current | 90.7 | 88.9 |
| Peak to peak inductor ripple current (mA) | 146.93 | 357.24 |
| Switching frequency (MHz) | 2 | 1.69 |
| Duty cycle (%) | 46.18 | 47.44 |
| Peak-to-peak output ripple voltage (mV) | 1.322 | 3.215 |
| Total power dissipation (mW) | 12.4 | 100.88 |
| Footprint ($mm^2$) | 37 | 93 |

Algorithm 1 Real time workload partitioning and scheduling on a many-core system with underprovisioned OCVRs.

Inputs:
Set of real time tasks: $\mathcal{T}$
Set of $N$ cores in the many-core system: $\Pi$
Outputs: Schedulable taskset ($\Theta_j$) on each core $\pi_j \in \Pi$ with assigned voltage $V_j \in [V_{dd\_1}, V_{dd\_2}, ..., V_{dd\_m}]$ and frequency $f_j \in [f_1, f_2, ..., f_m]$
procedure PARTITION($\mathcal{T}, \Pi$)
    for each $\pi_j \in \Pi$ do
        $\Theta_j \leftarrow \emptyset$, $U \leftarrow 0$
    end for
    $\mathcal{T}' \leftarrow$ SORT($\mathcal{T}$ by descending $max_j$ $u_{i,j}$)
    for each $\tau_i \in \mathcal{T}'$ do
        $\Pi' \leftarrow j: U_j + u_{i,j} < f_{m,j}$   ▷ Cores on which $\tau_i$ is schedulable
        if $\Pi' = \emptyset$ then return Failed to schedule
        end if
        k $\leftarrow$ arg $min_{j \in \Pi'}$ $P_j(U_j + u_{i,j})$   ▷ core id on which $\tau_i$ consumes least power
        $\Theta_k \leftarrow \Theta_k \cup \tau_i$ ▷ $\Theta_k$ is the schedulable set of tasks on $\pi_k$
        $U_k \leftarrow U_k + u_{i,j}$
    end for
    return $\Theta$
end procedure
procedure DVFS($\Theta$)
    while $\sum_{\pi_j \in \Pi} f_j^\alpha > (P_{total} - N \cdot \beta)/\kappa$ do
        for each $\pi_j \in \Pi$ do
            while $\sum_{\tau_i \in \Theta_j} u_{i,f_j} \leq f_m$ do
                $f_j \leftarrow (f_x \mid f_x \in F$ and $f_x \leq f_j)$ ▷ lower the operating frequency to one of the supported DVFS levels $F = (f_1, f_2, ..., f_m)$
            end while
        end for
    end while
end procedure
procedure SCHEDULE($\Theta_j, f_j$)
    k $\leftarrow$ arg $min_{\tau_i \in \Theta_j} D_i$
    $\pi_j \leftarrow \tau_k$
end procedure

Table 4: Parameters to generate real time periodic tasksets.

| Parameter | Value |
|---|---|
| Number of tasks ($N_t$) | [32, 48, 64, 80] |
| Task utilization range | [0.1 to 0.9] |
| Task period range in seconds ($T_i$) | [10 to 100] |
| Taskset utilization factor ($\rho$) | [0.1 to 1] |

Architectural parameters of the core.

| Parameter | Value |
|---|---|
| Core clock frequency | 2.4 GHz |
| Power supply voltage ($V_{dd}$) | 1 V |
| Issue, Commit width | 2 |
| INT and FP Instruction Queue | 16 entries |
| Load and Store Queue | 16 entries |
| INT and FP Physical Register File | 48 entries |
| ROB size | 48 |
| L1 cache | 32 KB, 4-way |
| L2 cache | 256 KB |

Table 5

Algorithm 2 Load balanced power delivery with run-time OCVR clustering to support higher than average load current consumption.

Inputs:
Current consumption sensed from the core: $I_{sense\_x}$
Current threshhold: $\Delta I$
Voltage level applied to the core: $V_x \in [V_{dd\_1}, V_{dd\_2}, ..., V_{dd\_m}]$
where $x \in [1,...,n]$, m = number of DVFS levels, n = number of OCVRs/Cores
Switch matrix: $Switch_{n,n-1}$
Constraints:
$t_{switch} + t_{PMU} < t_{core}$
$\sum_{i=1}^{n} V_x \cdot I_{sense\_x} < n \cdot V_{dd\_m} \cdot I_{avg}$ 1: Append array $CORE\_RED$ with core id $x$ where $I_{sense\_x} \geq I_{avg} - \Delta I$
2: Append array $CORE\_GREEN$ with core id $y$ where $I_{sense\_y} < I_{avg} - \Delta I$
3: if $length(CORE\_RED) > 0$ then
4:   call $OCVR\_CLUSTER$ ▷ Reconfigure the PDN by clustering the output of OCVRs
5: else
6:   call $OCVR\_DECLUSTER$ ▷ Reconfigure the PDN by de-clustering the output of OCVRs
7: end if
8: procedure OCVR_CLUSTER
9:   for each $i$ in min(length($CORE\_RED$), length($CORE\_GREEN$)) do
10:     $Demand(i) \leftarrow CORE\_RED(I_{sense\_i}) + CORE\_GREEN(I_{sense\_i})$
11:     if $Demand(i) \leq 2 \cdot I_{avg}$ then
12:       $V_{CORE\_RED(i)} \leftarrow V_{CORE\_GREEN(i)}$ ▷ Align the $V_{dd}$ levels of the two cores whose OCVR outputs are being combined
13:       $Switch_{CORE\_RED(i),CORE\_GREEN(i)} \leftarrow 1$ ▷ Close the switch so that $CORE\_RED(i)$ is served by the OCVR connected to $CORE\_GREEN(i)$
14:       Delete $CORE\_RED(i)$ and $CORE\_GREEN(i)$ from the respective arrays
15:     end if
16:   end for
17: end procedure
18: procedure OCVR_DECLUSTER
19:   for each nonzero element in sparse matrix $Switch$ do
20:     if $I_{sense\_i} + I_{sense\_j} < 2 \cdot I_{avg} - \Delta I$ then
21:       $Switch_{i,j} \leftarrow 0$ ▷ Open the switch connecting core $i$ with OCVR $j$
22:     end if
23:   end for
24: end procedure

FIG. 7(b)

Simulation parameters for Algorithm 2

| Parameter | Value |
|---|---|
| Number of Cores | 8, 16, 32, 64, 128 |
| DVS levels | 0.7 V, 0.8 V, 0.9 V, 1 V |
| OCVR current rating ($I_{avg}$) | 0.6 A |
| Current threshold ($\Delta I$) | 0.1 A |
| Load current variation | SPEC benchmark power consumption statistics |
| Execution duration | 10 million CPU cycles |

Table 6

FIG. 9(c)

Circuit parameters and power consumption for two peak load currents of DC-DC switching buck converters

| Parameter | Maximum output current of 6 A | Maximum output current of 0.6 A |
|---|---|---|
| Peak to peak inductor ripple current | 1.65 A | 182.5 mA |
| Switching frequency | 368.25 kHz | 100.02 kHz |
| Duty cycle | 43.4% | 40.16% |
| Peak-to-peak output ripple voltage | 1.924 mV | 2.281 mV |
| Inductor power dissipation | 260.83 mW | 675 µW |
| Output capacitor power dissipation | 368.91 µW | 13.56 µW |
| Total power dissipation | 688.99 mW | 22.65 mW |
| Footprint | 209 $mm^2$ | 161 $mm^2$ |

Table 7

FIG. 9(d)

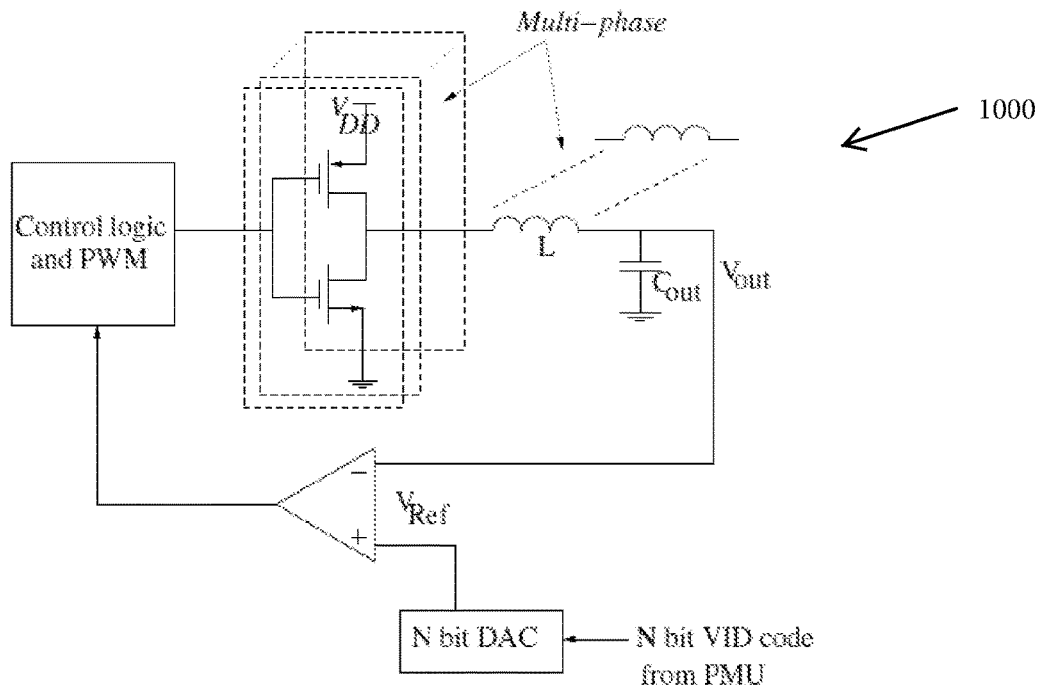
FIG. 10: Schematic of a multi-phase DC-DC switching buck converter.
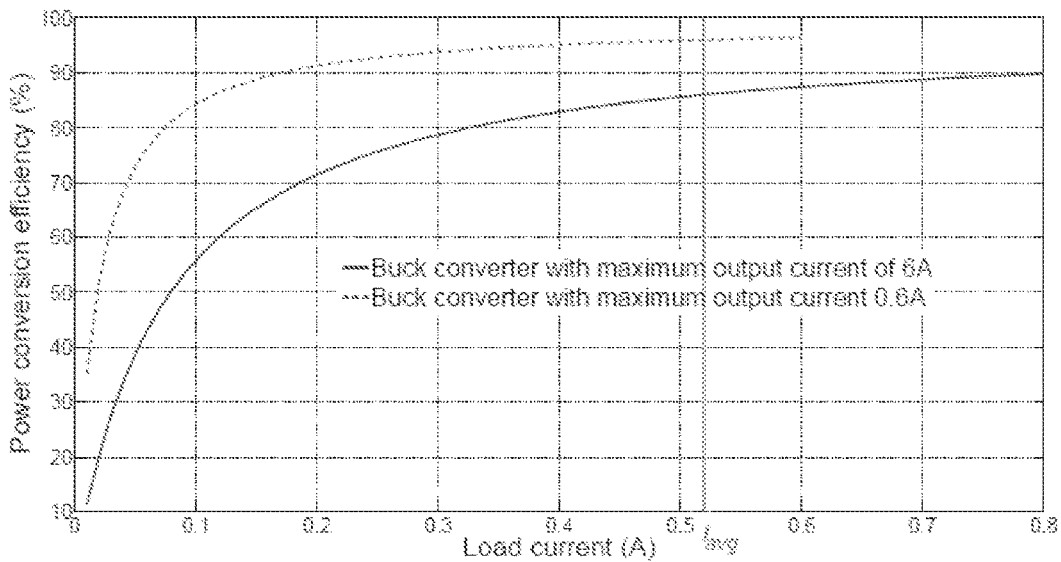
FIG. 11

Parameters of the PDN determined through SPICE simulation.

| Parameter | Value |
|---|---|
| PMOS Width | 800 µm |
| PMOS switching time | 160 ps |
| Area occupied by 16x15 switching network | 9600 µm² |
| Per core maximum switching capacitance | 2.4 nF |
| Piecewise constant load current variation | Stochastic model |
| $P_{switch}$ | 0.1 W |
| $P_{conduction}$ | 0.06 W |
| $P_{static}$ (obtained through McPAT) | 0.175 W |

Table 8

FIG. 11(a)

WORK LOAD SCHEDULING FOR MULTI CORE SYSTEMS WITH UNDER-PROVISIONED POWER DELIVERY

BACKGROUND

Energy efficiency has emerged as a critical design parameter in multi-core or chip multi-processor (CMP) systems. Low power workload scheduling on heterogeneous processors is a widely researched field but the existing workload schedulers ignore the power lost in the DC-DC converters delivering regulated power supply to the cores.

The conventional method used to design the power delivery network may be over-provisioned by at least an order of magnitude of the maximum output current rating of the below-described on-chip voltage regulators (OCVRs). Looked at another way, the power rating and the design topology of the OCVR is selected based on the maximum possible power consumption of the load circuit.

With the paradigm shift in computing systems from performance oriented design to energy efficiency, considerable research effort has focused on optimizing the core configuration by reducing the over-provisioning of the core resources. Little attention, however, is given to the reduction in the over-provisioning of the circuits delivering power to the cores. Conventionally, the voltage regulator and power conditioning circuits are off-chip. The power consumption and the footprint of the voltage regulators and the conditioning circuits is therefore not a concern while optimizing the power delivery to the core(s).

The introduction of chip multi-processors (CMPs) resulted in new challenges in the delivery of power to the multiple cores. Providing low latency, per-core dynamic voltage and frequency scaling (DVFS) is challenging with off-chip voltage regulators. The power supply voltage regulation is also reduced due to longer on-chip interconnects connecting the off-chip VR to the multiple load circuits. On chip voltage regulators (OCVRs) have been researched and successfully introduced in commercial multi-core systems in Intel 4th generation processors as well as IBM POWER8 servers. The choice of OCVR topology is dependent on several factors including system level parameters such as the optimal power conversion efficiency and maximum load current consumption as well as the physical design of the passive components. System level tools such as a power virus or McPAT may be used to determine a first order estimate of the peak power consumption of the cores, which is typically overestimated. As a result, the OCVR and the power delivery network are over-provisioned to support a peak load current larger than what is consumed by the cores.

Recent work has attempted to improve the energy efficiency of multi-core and many-core systems by reconfiguring the power delivery network according to the power demand of the work load. For example, an RPDN using switched capacitor volt age regulators (SCVRs) and cross bar switches may serve 8 cores. The RPDN includes 32 cells, where each cell is an SCVR capable of supporting two voltage step down conversions (2:1 and 3:2). The simulation results indicate that the reconfigurable power delivery network offers 40% energy savings as compared to a configuration with per core voltage regulators. The switched capacitor voltage regulators offer 80% power conversion efficiency. This work does not address the inferior voltage regulation offered by the SCVRs.

A run time reconfigurable voltage regulator network of buck converters may also be used to improve efficiency. The lowest energy consumption across various DVFS levels is determined by solving an integer linear programming (ILP) problem. The timing penalty to set the switching network may not be not quantified and the ILP is solved for discrete DVFS timing penalties ranging from 5% to 15%. An off-chip buck converter (LTC3816) SPICE model may be used instead of an OCVR model, although the OCVR may offer an order of magnitude faster voltage response time under DVFS.

An RPDN for 3-D many-core systems may also be used. Single input multiple output buck converters supply power to the many-core system. The energy optimization problem across DVFS operating points (voltage and frequency pairs) may be addressed through ILP formulation.

Further, clustering of voltage regulators to boost the energy efficiency of the system may be used, but such solutions currently ignore the variation in the power conversion efficiency (PCE) of the voltage regulators due to dynamic voltage and frequency scaling. Ignoring the PCE variation of the voltage regulators may lead to suboptimal workload mapping and therefore a large penalty on the energy savings possible with DVFS.

Recent work on RPDNs does not offer an analysis of the deterioration in the response time of the power delivery system due to the search and decision time needed to flip the requisite number of switches and reconfigure the connections between the cores.

SUMMARY OF THE EMBODIMENTS

Apart from increased energy efficiency, power delivery through OCVRs offers several benefits such as reduced latency to apply dynamic voltage and frequency scaling (DVFS), point of load power delivery with minimal power supply noise, and reduced I/O pin count devoted to power and ground signals. The peak power consumption and worst case power supply noise transient in a CMP determine the design of the power delivery system.

BRIEF DESCRIPTION OF THE DRAWINGS

FIG. 2(a) shows Table 2 that shows parameters of the CMP cores derived from the Samsung Exynos 5410 big.LITTLE architecture.

FIG. 3 shows the variation in power conversion efficiency with load current.

FIG. 3(a) shows Table 3 that shows Operating values of the switching DC-DC buck converters [12] serving the ARM A15 and A7 cores.

FIG. 3(b) shows Algorithm 1, that describes real time workload partitioning and scheduling on a many-core system with under provisioned OCVRs.

FIG. 7(b) shows Algorithm 2 that describes the switching control of the HSS fabric.

FIG. 9(c) shows Table 6 that shows simulation parameters of Algorithm 2.

FIG. 9(d) shows Table 7 that shows the circuit characteristics and power consumption of the components of the buck converters.

FIG. 10 shows a circuit schematic of a buck converter with multiple phases of the filter circuit, MOS power transistors, and cascaded buffers.

FIG. 11 shows a graph showing the variation in the PCE with the output current for the two buck converters.

FIG. 11(a) shows Table 8 that shows the parameter values of the switching network and the PDN.

DETAILED DESCRIPTION OF THE EMBODIMENTS

1. Work Load Scheduling for Multi Core Systems with Under-Provisioned Power Delivery

1.1 Introduction

Figure 1:
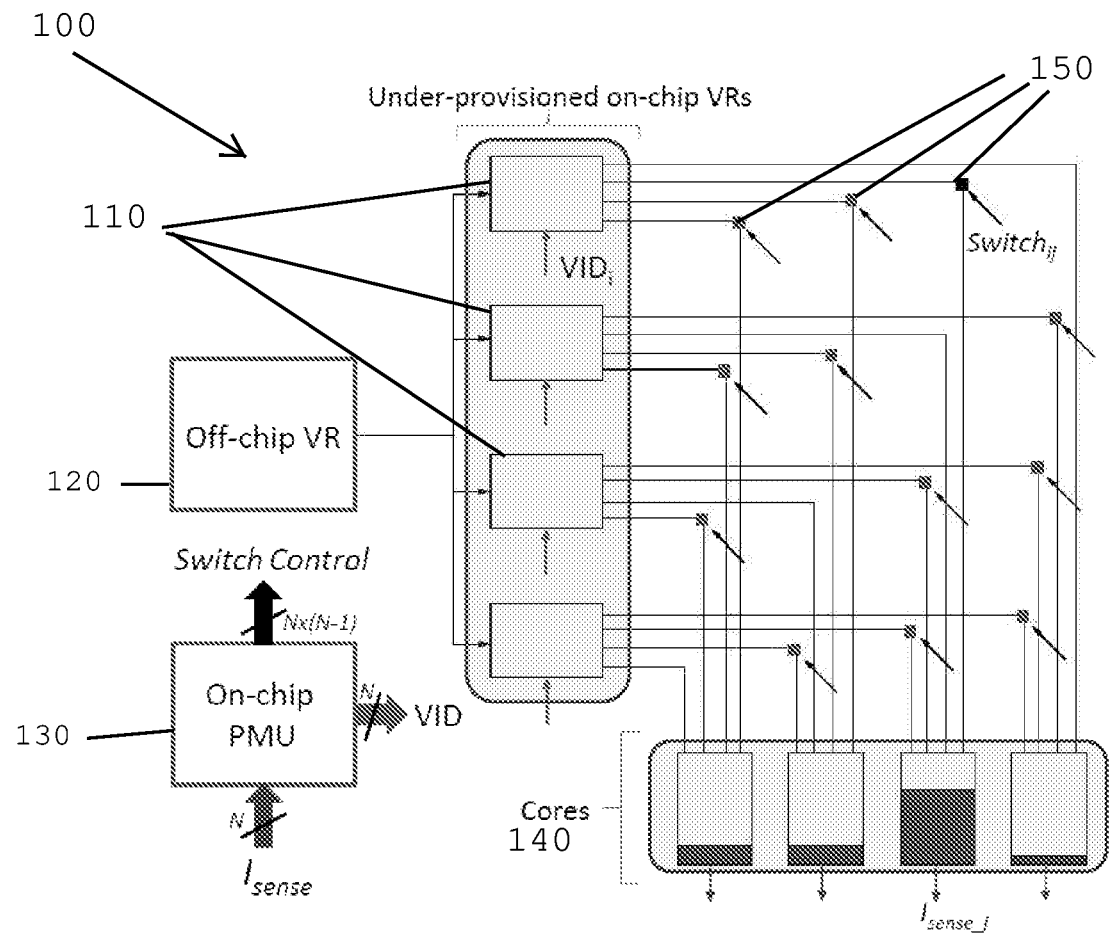
FIG. 1 shows an interconnected on-chip power delivery network.

By under-provisioning the OCVRs to meet the typical or average need of the load circuits, the energy efficiency of the CMP system may be increased by up to 44%. A reconfigurable power delivery network 100 with run-time clustering of the outputs of the OCVRs 110 can be seen in FIG. 1, which shows an interconnected on-chip power delivery network 100. The on-chip power delivery network 100 may be in communication with an on-chip PMU 130, an off-chip VR 120, which as shown, is in communication with the OCVRs 110. The on-chip voltage regulators 110 are designed for a maximum output current equal to the average load current demand of workloads executed on the cores (Iavg) 140, to which they are connected via switches 150. An algorithm for run-time voltage regulator clustering through a switching fabric may be used to meet greater than Iavg load current demand.

An algorithm developed for run-time OCVR clustering is an example of supply side load management. The on-chip power management unit reconfigures the connections (switches 150) between the OCVRs 110 and the cores 140 to meet the changing load current demands of the cores 140. The run-time reconfiguration of the power delivery network 100 operates under a power constraint. The total power demanded at any time instant by the cores 140 is less than the total power delivery capability of the OCVRs 110. The power constraint is expressed mathematically in Equation 1 below for a CMP with N cores and N OCVRs. Isense_x and Vx are, respectively, the sensed load current and the operating voltage of each core x. $I_{avg}$ and $V_{dd\_m}$ are, respectively, the maximum output current and the maximum supported power supply voltage level of each OCVR.

$$\sum_{i=1}^{N} V_x \cdot I_{sense\_x} < N \cdot V_{dd\_m} \cdot I_{avg} \qquad \text{Equation 1}$$

An energy optimized work load scheduling technique is described herein that relaxes the power constraint on the run-time OCVR clustering algorithm (Equation 1). The workload scheduler described herein may be a demand side load management technique. Workload schedulers may be classified into three categories: best effort scheduling, with acceptance test, and robust scheduling. The proposed heuristic imposes an acceptance test on each incoming task in the system and schedules it on to one of the cores if it meets the power constraint of the under-provisioned power delivery system. Workloads running on a CMP system may be either controllable loads with soft deadlines or non-controllable loads with hard deadlines. The rescheduling of controllable tasks reduces the energy consumption of the CMP system for a given scheduling cycle. Real time applications fall under the category of non-controllable loads as they impose a hard or firm deadline. In the case of non-real time tasks with soft deadlines and fixed priority, the tasks may violate the power constraint given by Equation 1 may be executed in the next scheduling cycle, leading to a performance penalty.

The energy consumed by a taskset on a processing element is a convex function of the computational capacity of the processing element and the task execution time. A convex energy optimization problem is solved to ensure the reliability of the proposed reconfigurable power delivery system with under provisioned on-chip voltage regulators. The optimization problem is constrained by the total power budget of the CMP and is limited to the peak current rating of the OCVRs. The feasibility of the solution, determined by solving the optimization problem, is demonstrated through a real time workload scheduling heuristic. The scheduler is applicable to homogeneous and heterogeneous CMPs.

1.2 System Model and Notations

The under-provisioned CMP system 100 includes a set of processing elements or cores 140 and per-core on-chip voltage regulators. The models constructed for the core architecture, CMP platform, voltage regulators, real time periodic tasks, and the power consumption of the cores are described in Subsections 1.2.1 through 1.2.4.

1.2.1 System Models

Figures 1A, 2:
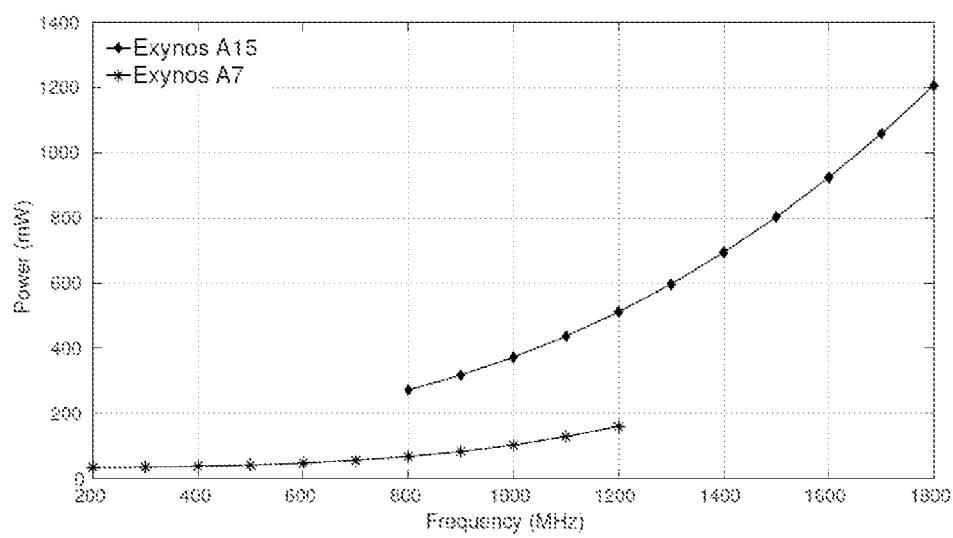
FIG. 1(a) shows Table 1 that shows Frequency {MHz) and Voltage (V) pairs used by the DFVS procedure in Algorithm 1. The bold values listed in the table are the nominal voltages and frequencies.
FIG. 2 shows the power consumption of the Exynos big.LITTLE cores with frequency based on the model given by Equation 2.

CMP systems with homogeneous core configurations as well as heterogeneous configuration were developed to analyze the work load scheduler. The homogeneous CMP may include processing elements based on the ARM A15 core integrated in the Samsung Exynos 5410 platform. The parameters used in constructing a 16 core homogeneous CMP platform are listed in FIG. 2(a) Table 2. An eight core heterogeneous CMP with four ARM A15 and four A7 cores from the Exynos 5410 platform were also evaluated. The DVFS levels applied to the cores are listed in FIG. 1(a), Table 1. The variation in the power consumption of the core with frequency, based on the power model given by Equation 2 and validated, is shown in FIG. 2

1.2.2. Power Model

The power consumption of a processing element πj may be approximated as a function of frequency. The power consumed by any processing element is given by Equation 2. The $\kappa * f^\alpha$ and $\beta$ terms in Equation 2 represent, respectively, the dynamic and static power consumption of the cores. The model parameters $\kappa$, $\alpha$, and $\beta$ for the Samsung Exynos A15 and A7 processors may be used to validate Algorithm 1. The power consumption with frequency using the estimated model parameters is shown in FIG. 2.

$$P(f) = \kappa * f^\alpha + \beta \quad \text{Equation 2}$$

1.2.3 Voltage Regulator Models

An on-chip power delivery network with per core voltage regulation may be considered for the CMP platform. The on-chip voltage regulators (OCVRs) may be modeled as DC-DC switching conversion efficiency based on the power consumption of the A15 and A7 cores (shown in FIG. 2). Certain parameters of the buck converters for both the big and LITTLE cores are listed in FIG. 3(a), Table 3. FIG. 3 shows the variation in power conversion efficiency with load current.

1.2.4 Real-Time Periodic Task Model

The real-time workloads may be modeled as a set of independent periodic tasks $\tau_i \in T$ to be scheduled on a subset of cores of a many-core system $\pi_j \in \Pi$. Each task $\tau_i$ has a hard deadline of $D_i$. Each core $\pi_j$ supports distinct DVFS levels $V_x \in [V_{dd\_a}, V_{dd\_2}, \ldots V_{dd\_m}]$ and $f_x \in [f_1, f_2 \ldots, f_m]$. A task $\tau_i$ with a hard deadline $D_i$ may require at most $C_{i,j}$ cycles to execute on a core $\pi_j$ at the highest supported voltage $V_{dd\_m}$ and frequency $f_m$. The context switching overhead and overhead due to resource sharing amongst tasks that remain unresolved after task partitioning may be included in $C_{i,j}$. The computational capacity required by task $\tau_i$ on core $\pi_j$ may be defined as $u_{i,j} = C_{i,j}/D_i$. The subset of tasks $T_j$ that are executed on core $\pi_j$ therefore require a total computational capacity of $$U_j = \sum_{\tau_i \in T_j}^{v} u_{i,j} \quad \text{Equation 2.1}$$

cycles per second.

1.3 Optimal Workload Scheduling

An optimization problem may be defined to partition and schedule real time workloads on a many-core platform. A specific set of constraints unique to the proposed reconfigurable PDN may be considered, which account for the use of under provisioned on-chip voltage regulators. The objective of the optimization problem may be to minimize the energy consumption of the many core platform, including the power consumed by the OCVRs. The energy consumed by the system in a given scheduling period $T_{epoch}$ is given by Equation 3, where $P(U_j)$ is the power consumed by the core $\pi_j$ with computational capacity $U_j$ to execute the scheduled task set, and $PCE_{U_j}$ is the combined power conversion efficiency of the OCVR(s) supplying current to the core $\pi_j$. The workload scheduling may be constrained by the total computational capacity available to execute the taskset $U_j$ on $\pi_j$, where the total capacity must exceed the computational demand of the taskset as given by Equation 4. In addition, the operating frequency must fall within the supported frequency range of the cores as given by Equation 5. The total power consumed by the cores at any time instant must be less than the combined maximum power supported by all OCVRs in the system as described by Equation 6.

$$\min_{U_j} \sum_{\pi_j \in \Pi} \frac{P(U_j)}{PCE_{U_j}} \cdot T_{epoch} \quad \text{Equation 3}$$

-continued $$\text{s.t.} \sum_{\pi_j \in \Pi} U_j \geq \sum_{\tau_i \in T} u_i \quad \text{Equation 4}$$

$$f_{1,j} \leq U_j \leq f_{m,j} \ \forall \ \pi_j \in \prod \quad \text{Equation 5}$$

$$\sum_{\pi_j \in \Pi} P(U_j) < N \cdot V_{dd\_m} \cdot I_{avg} \quad \text{Equation 6}$$

1.4 Workload Scheduling Heuristic

A heuristic and method may perform the real time workload scheduling on the cores for the optimization problem developed in Section 1.3. The heuristic may include three procedures: PARTITION, DVFS, and SCHEDULE. The PARTITION procedure is an evolution of a Marginal Power Heuristic (M-PWR), which sorts the tasks in decreasing order of their computation demand and assigns them to cores such that each assignment leads to minimal increase in the power consumption of the core. The power consumed for executing a task with a finite deadline is proportional to the computation demand of the task. Optimal workload partitioning may be achieved by incrementing the load on each core (using, for example, a workload scheduler in the operating system) such that the constraint given by Equation 5 is not violated. For example, the tasks $\tau_i \in T$ may be first sorted in decreasing order of the maximum computational demand $u_{i,j}$ on cores $\pi_j \in \Pi$. A task may be assigned to a core if the scheduling of the task results in the least increase in the power consumption. The output from the procedure is a scheduled taskset $\Theta_j$ on each core.

The DVFS procedure reduces the operating frequency and the voltage of the cores until the constraint given by Equation 6 is satisfied. The right hand side of Equation 6 is a constant value equal to the total power Ptotal of the CMP. Expressing the total power consumed by the cores with the power model given by Equation 2 in constraint Equation 6 may provide a limit to the operating frequency of the cores raised to the power (refer to constraint in Equation 8). The use of the DVFS procedure results in the optimal frequency of operation for each core by solving the bounded knapsack problem. (The knapsack problem is a problem in combinatorial optimization: Given a set of items, each with a weight and a value, determine the number of each item to include in a collection so that the total weight is less than or equal to a given limit and the total value is as large as possible. It derives its name from the problem faced by someone who is constrained by a fixed-size knapsack and must fill it with the most valuable items. The problem often arises in resource allocation.)

The deadline of each task in the taskset $\Theta_j$ is analogous to the value of the item in the knapsack. The required computational demand at a given frequency $f_j$ on processor $\pi_i$ is $u_i, f_j$. The weight added to the knapsack is analogous to $u_i, f_j$. The objective of the knapsack problem is to maximize the number of tasks executed on a core, without violating the task deadline. The procedure lowers the operating frequency of each task until constraints Equations 7 and 8 are satisfied. Once the operating frequency of each task in $\Theta_j$ is determined, the SCHEDULE procedure schedules the tasksets on each core based on an earliest deadline first policy.

$$\sum_{\tau_i \in \Theta_j} u_{i,f_j} \leq f_m \quad \text{Equation 7}$$

-continued $$\sum_{\pi_j \in \Pi} f_j^a \le (P_{total} - N \cdot \beta)/k \qquad \text{Equation 8}$$

1.5 Simulation Results

Real time periodic tasks with implicit deadlines were considered to determine the efficacy of the proposed task scheduler. The task scheduling is performed for one hyperperiod of the taskset Tepoch, which is the least common multiple of the implicit deadlines of all tasks $\tau i \in T$. The tasks were generated with the parameters listed in FIG. 3(c), Table 4. The computational capacity (uij) of the tasks is selected as a random variable with a uniform distribution between 0.1× to 0.9× the maximum supported operating frequency of the cores in the CMP (maximum frequency fm of 1800 MHz). The total computation time requested by the taskset in a hyperperiod was less than the available time on the processing elements to prevent system overload. This ensured that the taskset utilization factor or the system load is less than 1 (p<1).

Figures 3C, 4:
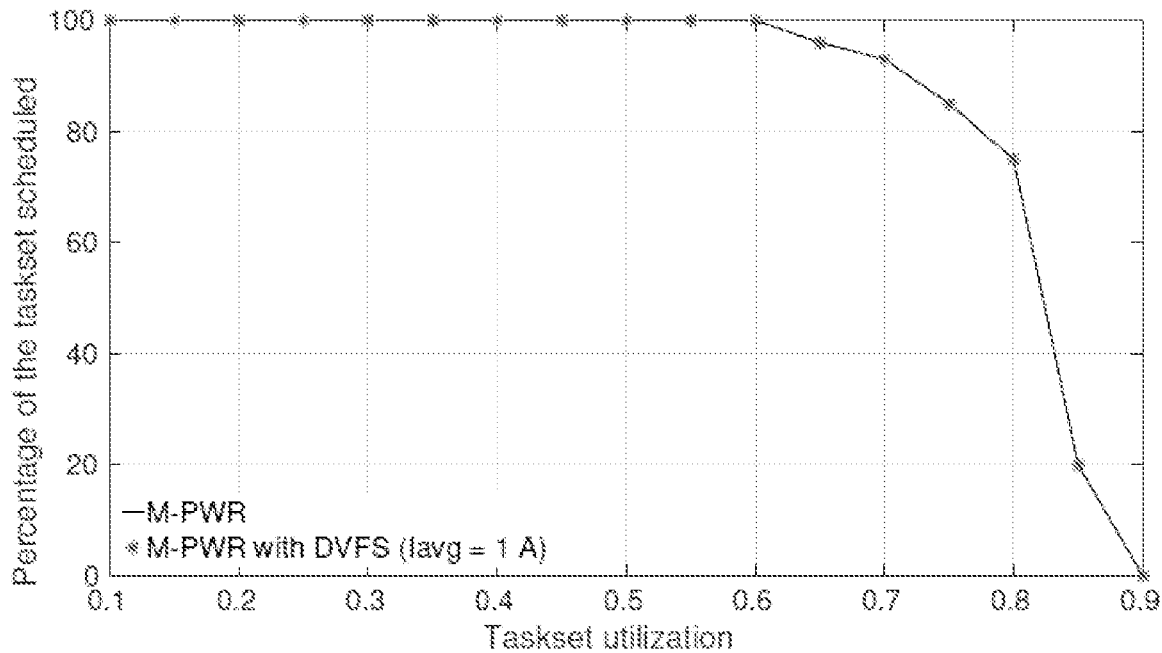
FIG. 3(c) shows Table 4 that shows Parameters to generate real time periodic tasksets.
FIG. 4 shows a percentage of tasks successfully partitioned by the M-PWR heuristic and successfully scheduled by Algorithm 1 in a 16 core homogeneous CMP.

The resulting task schedule, from execution of Algorithm 1 (see FIG. 3(b)) on a homogeneous CMP platform with 16 cores configured as Exynos 5410 A15s, is shown in FIG. 4. The task scheduling is constrained due to the limited power budget of the under-provisioned voltage regulators. For a maximum output current Iavg of 1 A, the percentage of tasks scheduled by Algorithm 1 is identical to the M-PWR heuristic. The execution of Algorithm 1 is further characterized on a homogeneous platform with voltage regulators of varying maximum output current Iavg. The results are shown through the contour plot in FIG. 5. The percentage of tasks scheduled for a given taskset utilization factor decreased as the maximum output current of the voltage regulators was reduced. For a voltage regulator designed with a maximum output current Iavg of 0.7 A, the percentage of tasks scheduled matched the M-PWR heuristic up to a taskset utilization factor ρ of 0.65.

Figure 6A:
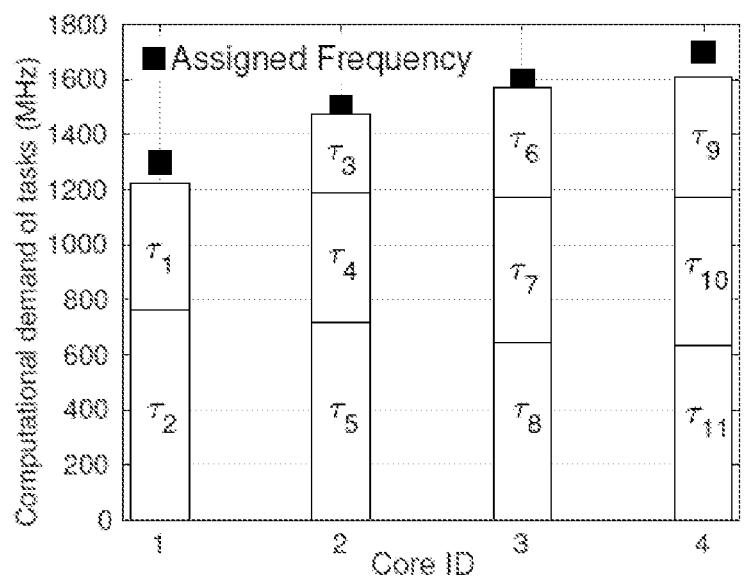
FIGS. 6(a) and 6(b) show a snapshot of the task assignment on a heterogeneous CMP platform with (a) big cores modeled on A15 parameters, and (b) LITTLE cores modeled on A7 parameters. The maximum output currents of the voltage regulators serving each of the big cores and LITTLE cores are, respectively, 800 mA and 110 mA.
Figure 6B:
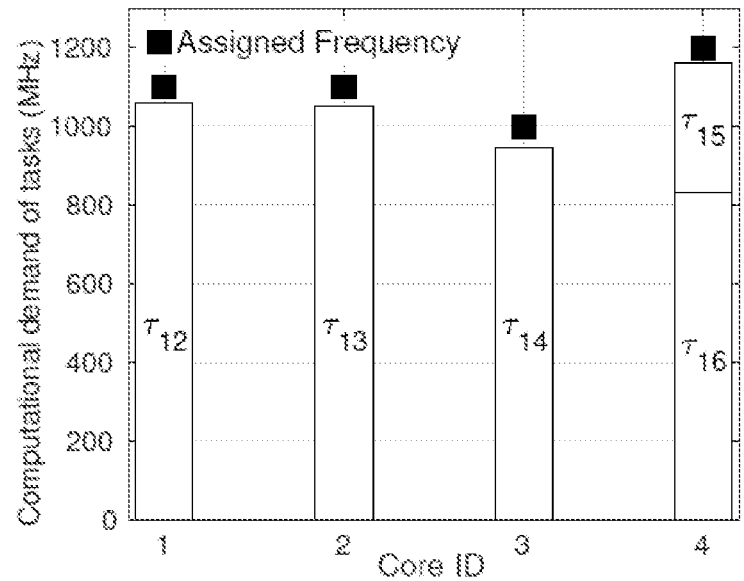

The workload scheduler was also evaluated on a heterogeneous CMP platform with four Exynos A15 (big) and four Exynos A7 (LITTLE) cores. For a randomly chosen taskset hyperperiod, the task distribution and corresponding computational demand (ui,j of each task) is shown in FIGS. 6(a) and 6(b). There were 11 tasks assigned to the big core cluster and five to the LITTLE core cluster. The maximum output current of the voltage regulators serving each of the big cores was set to 800 mA and the voltage regulators serving each of the LITTLE cores to 110 mA. The frequency assigned to each core to meet the constraint given by Equation 8 was determined and shown in the FIGS. 6(a) and 6(b). Depending on the total computational demand of the tasks assigned to each core, the frequency is lowered from the maximum supported frequency of 1800 MHz for the big cores and 1200 MHz for the LITTLE cores. The task partitioning performed by the PARTITION procedure further improves power efficiency by preferentially assigning tasks to the LITTLE cores, which meet the task utilization constraint given by Equation 4.

Consequently, for an identical scaling factor of the peak output current of the OCVRs (Iavg/Ipeak) serving the LITTLE core and the big core, the percentage of tasks scheduled through the DVFS procedure is lower for the LITTLE cores as compared to the big cores. As the LITTLE core cluster has a load current range of 100 mA, the scaling factor of the maximum output current of the voltage regulators serving the LITTLE cores is set to a larger value than that for the big cores to achieve a high task schedulability on the heterogeneous platform.

The task scheduling results on the homogeneous and heterogeneous CMP platform demonstrate that the proposed workload scheduler in tandem with the runtime on-chip voltage regulator clustering algorithm], offer an efficient and robust cross layer energy optimization mechanism for CMPs with under provisioned on-chip voltage regulators.

2. Load Balanced On-Chip Power Delivery for Average Current Demand Architecture

2.1 Introduction

A further interconnected on-chip power distribution network is modeled, and in particular, an architecture therefore. Rather than a static configuration designed for the worst case power consumption of the cores, a work load aware reconfigurable power delivery system, similar to the one above in some respects, follows. A detailed statistical analysis of the cycle accurate power consumption profile of workloads executed on a CMP system has been performed with results also described below.

Each OCVR may be designed to support a peak current rating equal to the average load current Iavg consumed across all workloads. SPICE simulations indicate that by reducing the peak current rating of the OCVRs to support Iavg, the energy efficiency of the CMP improved and the on-chip area occupied by the OCVRs may be reduced. A load balancing algorithm may further be developed for dynamic power management. The algorithm may be executed on the on-chip power management unit (PMU), and may be capable of reconfiguring the power delivery network (PDN) to combine the outputs of multiple OCVRs to support load currents in excess of Iavg.

2.2 Power Dissipation Behavior of Applications on a CMP System

Figures 7, 7A:
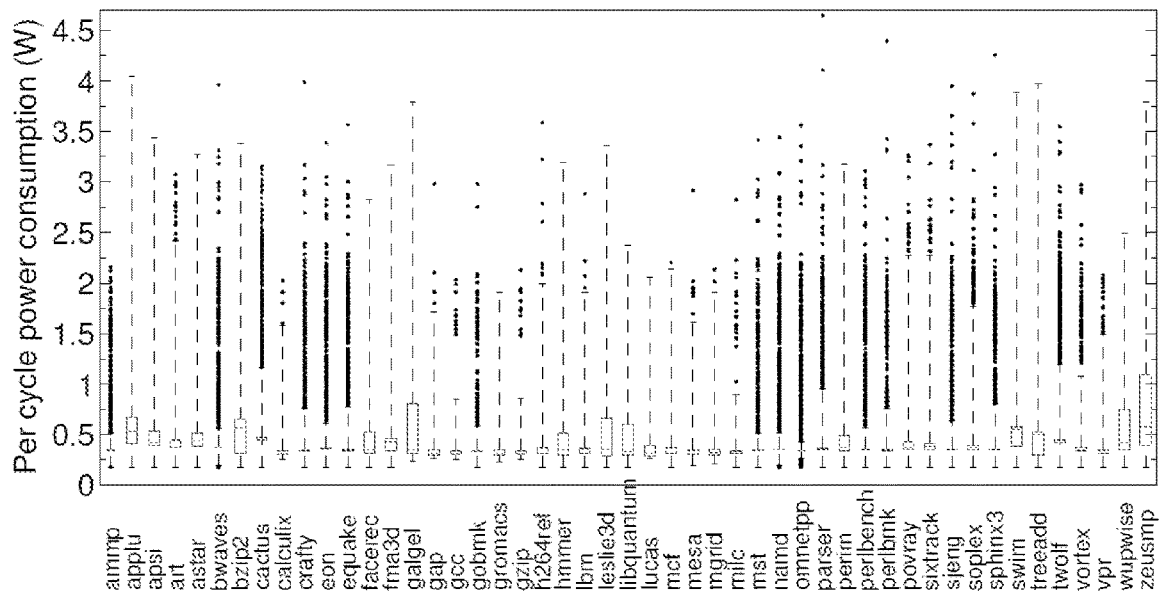
FIG. 7 shows a statistical analysis of the per cycle power consumption of the SPEC CPU 2000 and SPEC CPU 2006 benchmarks.
FIG. 7(a) shows Table 5 that shows architectural parameters of the core.

The cycle dependent power dissipation of the workloads executing on a CMP system provide insight to optimize the design of the PDN. Workloads which are computation intensive consume higher power during CPU bound phases of the application, but the maximum power consumed is considerably lower than the peak power consumption of a well-developed power virus. A detailed power trace analysis of the SPEC2000 and SPEC2006 benchmark suite was performed to obtain realistic power consumption statistics of the workloads. A 16-core CMP in 45 nm technology was modeled using a processor architectural simulator. McPAT was integrated in the simulator to analyze the power consumption of the core. Each core included a 2-way issue and out-of-order execution unit. The micro-architectural parameters of the core used in the simulations are summarized in FIG. 7(a), Table 5.

Each of the 49 benchmarks from the SPEC benchmark suite were simulated at four different timing intervals to cover multiple execution phases. The simulations were run for 10K cycles per time interval. The dynamic and static power consumption was sampled cycle by cycle through McPAT. The statistical dispersion of the per cycle power consumption of different SPEC benchmarks with single phase forwarding is shown through a box plot in FIG. 7. The interquartile range for all the studied benchmarks falls approximately an order of magnitude below the peak power (Ppeak) consumption of 5.73 W reported through McPAT simulations. The number of outliers beyond 5σ coverage for each benchmark was an insignificant fraction of the sample size. The combined power dissipation characteristics of all the 49 benchmarks was as follows: The minimum, average, and maximum power consumption was, respectively, 0.175

W, 0.555 W, and 4.755 W. The power dissipation of the applications is between 0.3 W and 0.5 W for approximately 65% of the execution time. The minimum, average, and maximum power dissipation variation per clock cycle was, respectively, 0 W, 0.195 W, and 4.333 W. The power variation is less than 0.1 W for 90% of the time. The studied benchmarks spend 78% of the run-time consuming less than the average power. The maximum power consumption of 4.75 W across all benchmarks was consumed for a very small percentage of the run time (7.5*10^−5%).

2.4 Proposed Design of the Delivery Network

Figure 8:
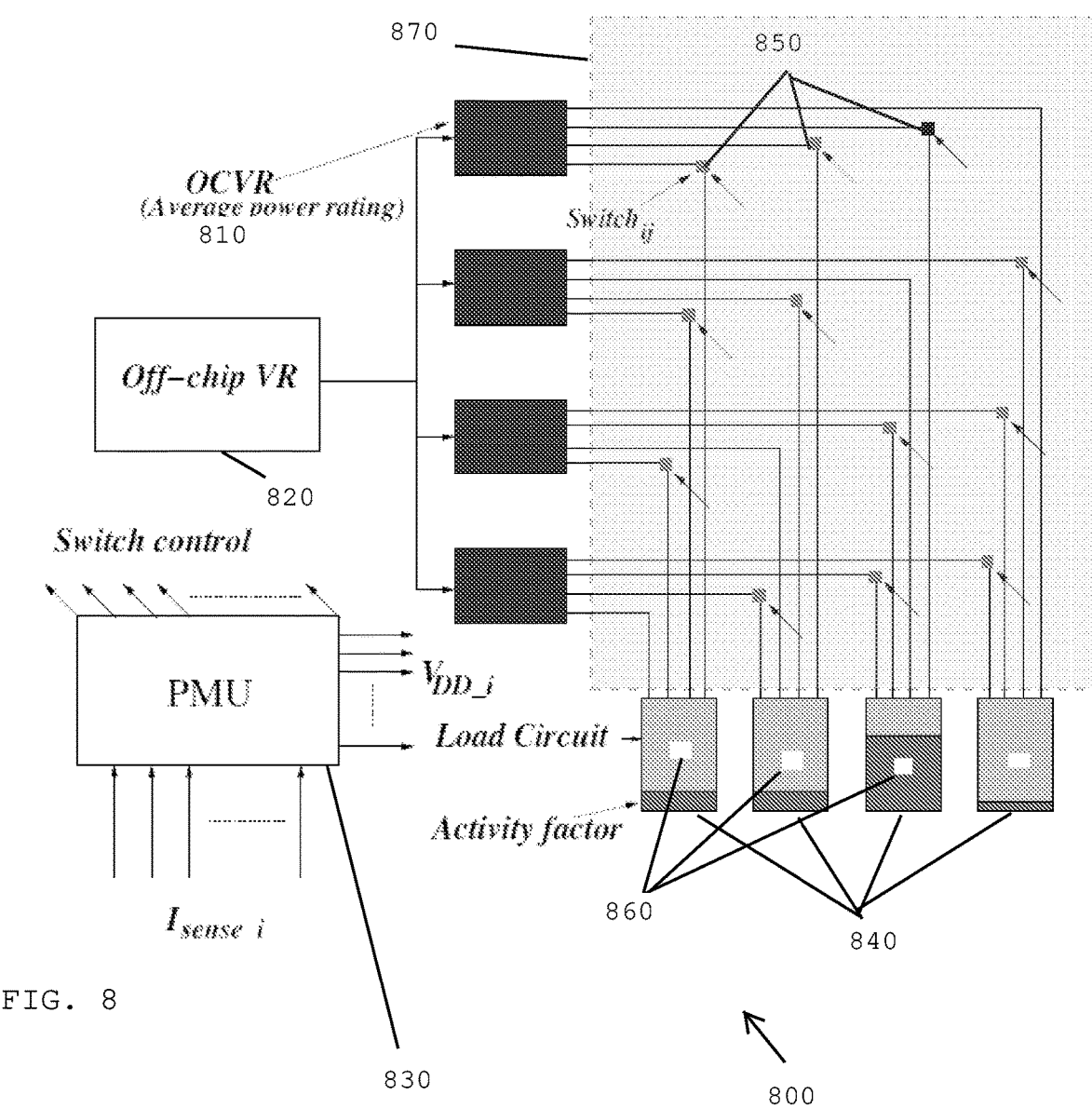
FIG. 8 shows a second proposed interconnected on-chip power delivery network.

Significant work has been done to optimize the core configuration, work load mapping, and dynamic/static clustering of the cores in a CMP system, but the energy and area loss incurred due to the integration of over-provisioned VRs has been overlooked. In the proposed power delivery system, the loadline of the OCVR serving each core or cluster of cores is designed for the average current (Iavg) consumed. Designing the OCVR loadline around Iavg reduces the peak voltage demand on the OCVR and significantly decreases the maximum supported load current. The block representation of the power delivery network 800 is shown in FIG. 8, which is similar to FIG. 1. For a CMP system including N cores 840 or core clusters, N OCVRs 810 provide the regulated power. In the proposed PDN, if the OCVR 810 serves a cluster of n identical cores 840, the power rating of the OCVR 810 is n Iavg. The output of each OCVR 810 may be connected to the inputs of a high-speed switching (HSS) fabric 870 through switches 850. The N outputs of the HSS fabric 870 are connected to the local PDN grid of the N cores 840 or core clusters. The HSS fabric 870 may be controlled by the power management unit (PMU) 830. The interconnected power delivery network 800 shown in FIG. 8 may provide increased service reliability as compared to conventional on-chip power distribution with a single OCVR 810 serving a single core. In addition, the interconnected network provides opportunity to balance load currents through reconfiguration of the switches 850.

2.4.1 Load Balancing Through Run-Time OCVR Clustering

A technique to deliver currents higher than Iavg is described in this section. Current sensors 860 placed in each core 840 may be constantly monitored by the PMU 830. A current sensor 860 such as a high-side bi-directional current sense circuit may be used. The sensor 860 monitors the voltage developed across an external sense resistor to represent the high-side current of the voltage regulator. When the sum of the currents sensed from all cores 840 within a cluster (Isense) reaches a threshold (ΔI) below Iavg, the PMU 830 configures the HSS 870 to source additional current from the OCVRs 810 which are located nearest to the cluster and are sourcing current less than Iavg. The logic controlling the HSS fabric within the PMU 830 may operate on two system parameters; the Vdd levels and the total load current sensed from each core cluster. The analysis of the power consumption provided in Section 2.2 indicates that the probability of the load current demand exceeding Iavg is 22%. As a result, there is always more than one core operating at or below Iavg. The PMU 830 may be provisioned to add at least one additional OCVR 810 to serve a core requiring current higher than Iavg. The sum of the decision time of the PMU 830 and the time to reconfigure the switches 850 must be less than or equal to the load current transient response time (current slew-rate) of an OCVR 810 with a current rating of Ipeak to ensure an uninterrupted power supply to the core cluster.

Figure 9A:
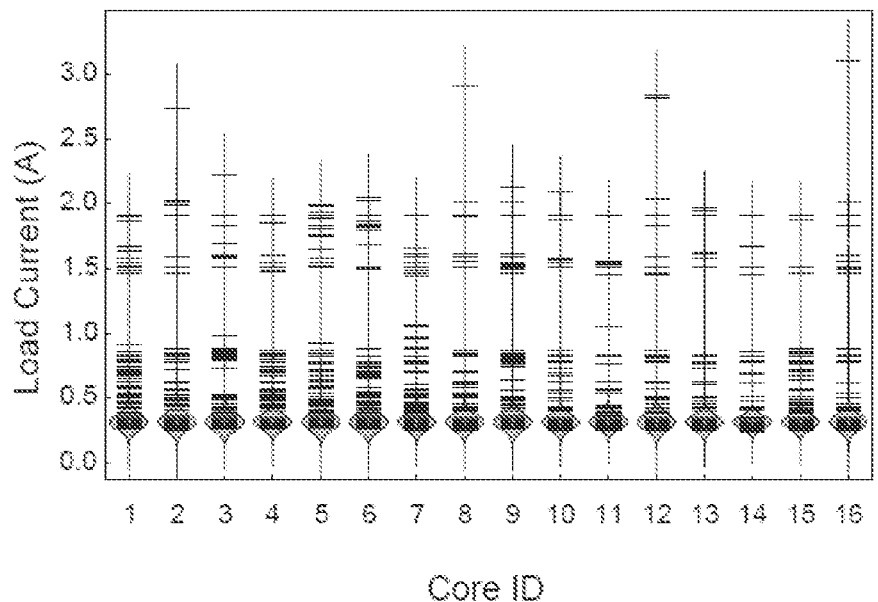
FIGS. 9(a) and 9(b) show simulated results of the implementation of Algorithm 2.
Figure 9B:
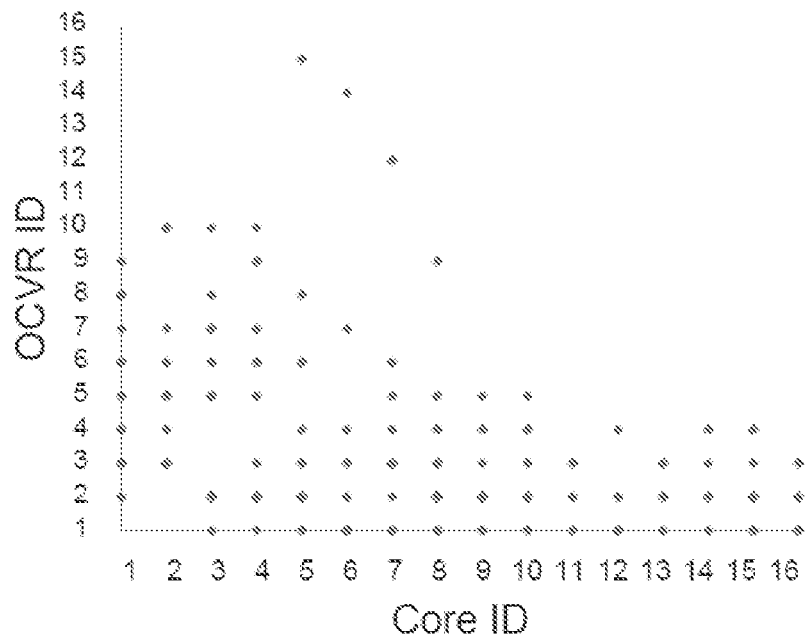

The switching control of the HSS fabric 870 is described by Algorithm 2 (see FIG. 7(b)). Algorithm 2 may be implemented in the Python programming language and is analyzed with the parameters summarized in Table 2. A stochastic model of the current consumption of the cores in a CMP system is developed based on the statistical parameters captured from the per cycle power consumption analysis of the SPEC benchmarks. The load current obtained from the stochastic model for 1000 CPU cycles across 16 cores is shown in FIG. 9(a). The peak current rating of each OCVR is set to 0.6 A (Ipeak), which is one order of magnitude less than the Ipeak obtained through McPAT. The active switches required to support the run-time load current variation on each core for 1000 CPU cycles are shown in FIG. 9(b). A generic statistical load current model is also analyzed through Monte Carlo simulations with a maximum possible value of Ipeak. Four DVS levels, listed in FIG. 9(c), Table 6, are selected corresponding to the core configuration provided in Table 5.

2.4.2 Energy Efficiency of CMP System

The switching DC-DC buck converter may offer superior power supply voltage regulation and is therefore an optimum choice to power the cores. The circuit implementation of a buck converter includes a switching network and a passive low pass filter. The inductor in the low pass filter acts as a low-loss energy transfer device which improves the power conversion efficiency. The power control efficiency (PCE) of the buck converter is analyzed for changes with the peak load current rating. The goal is to analyze the impact on the energy efficiency of the CMP when designing the OCVRs to support only the average load current demand of the cores.

2.4.2.1 Power Conversion Efficiency

The power consumed by the buck converter (Pbuck) is given by Equation 9. The Pmos, Pind, Pcap, and Ppwm are the power loss in, respectively, the MOS power transistors and the cascaded buffers driving them, the inductor and capacitor of the filter circuit, and the pulse width modulator circuit.

$$P_{buck} = P_{mos} + P_{ind} + P_{cap} + P_{pwm}$$  Equation 9

The power consumed by the filter circuit, power transistors, and the buffers driving them may increase with the maximum supported output current of the buck converter. Alternatively, multiple phases may be used to drive higher output currents. The circuit schematic of a buck converter 1000 with multiple phases of the filter circuit, MOS power transistors, and cascaded buffers is shown in an overview in FIG. 10. The multiple phase implementation of the buck converter may improve the power conversion efficiency and relax the design considerations for the LC filter and the power transistors driving the filter. The total load current pulled from the buck converter may be equally divided across the phases. The reduced current requirement per phase may lead to a reduction in the size and, therefore, the power dissipation of the filter and switching components. In addition, due to the ripple current cancellation across the filter output of the multiple phases, the output voltage ripple of a multi-phase buck converter may be smaller than a larger single-phase buck converter designed to support the peak current demand of the load.

Two custom buck converters with maximum output current ratings of 6 A and 0.6 A may be implemented. The two converters represent voltage regulators that support the Ipeak and Iavg currents of a CMP with core parameters as listed in Table 5. The circuit characteristics and power consumption of the components of the buck converters are listed in FIG. 9(d), Table 7. The buck converter with a maximum output current rating of 0.6 A consumes 22.65 mW, which is 3.3% of the power consumed by the over-provisioned buck converter. The on-chip implementation of the two buck converters yields similar ratios between the power consumed by each passive component, although at a higher switching frequency to reduce the size of the filter inductor and capacitor.

Figure 5:
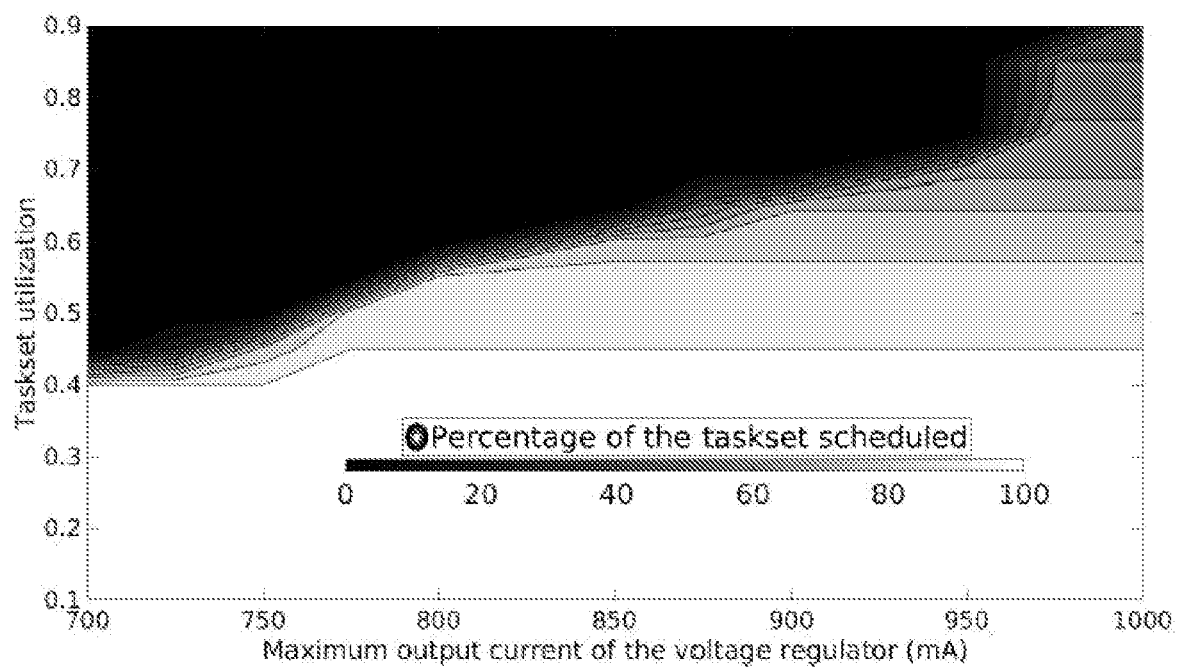
FIG. 5 shows a contour plot of percentage of tasks successfully scheduled by Algorithm 1 with varying taskset utilization and maximum output current of the voltage regulators in a homogeneous CMP with 16 cores.

The large reduction in the power dissipation of the buck converter achieved by reducing the peak load current rating results in an improvement in the PCE. Although the over-provisioned buck converter offers a peak PCE of 89.7% at an output current of 6 A, the reduction in the PCE with decreasing output current is significant. The variation in the PCE with the output current for the two buck converters is shown in FIG. 5. The typical workloads executed on the CMP (with the core configuration listed in Table 5) consume currents in the range of Iavg and therefore the buck converter with an output rating of 0.6 A offers a higher average PCE for a majority of the run-time of the workloads.

2.4.2.2 Improvement in Energy Efficiency

The total energy consumption of a CMP system implemented with a conventional PDN for a given execution time Tepoch with N cores and N OCVRs is given by Equation 10. The cores are served by over-provisioned OCVRs similar to the buck converter with a maximum output current of 6 A. The dynamic and static power consumed by the cores in the presence of DVFS are given by Pdynamic and Pstatic, respectively.

PCE1 represents the power conversion efficiency of the overprovisioned OCVR. At low load currents close to Iavg, the P CE1 offered by the over-provisioned buck converter is 87%. Alternatively, if the power delivery system is designed with each core supported by a buck converter that supplies a maximum output current of 0.6 A, the achieved PCE2 at Iavg is 96.36%. In addition, the static power consumed by idle cores or core clusters is close to zero as power gating through the HSS fabric is performed. The HSS fabric, however, imposes an additional switching loss Pswitch, which is the dynamic power consumed by the PMOS transistors while switching, and a conduction loss Pconduction while in the ON state and passing the average current Iavg.

$$E_{CMP,conventional} = \left\{ \sum_{i=1}^{N} \frac{(P_{dynamic\_i} + P_{static})}{PCE_1} \right\} \cdot T_{epoch} \quad \text{Equation 10}$$

The total energy consumed by the CMP with N OCVRs, where each OCVR is designed for an Iavg rating, and N×(N1) PMOS switches is given by Equation 11 The parameters j, k, and l are, respectively, the number of active cores consuming current below Iavg, the number of active core(s) consuming current above Iavg, and the number of idle core(s) power gated through the HSS network. In the case of idle cores, the power consumed by the OCVRs (POCVR,leakage) is the only component contributing to the system energy. As described in Section 2.2, applications consume current less than Iavg for about 78% of the time. The Pswitch loss is therefore incurred for 22% of the execution time of the workloads when the load current demand exceeds Iavg.

$$E_{CMP,proposed} = \sum_{i=1}^{T_{epoch}} \left\{ \sum_{i=1}^{j} \frac{(P_{dynamic\_i} + P_{static})}{PCE_2} + \right. \quad \text{Equation 11}$$

-continued
$$\left. \sum_{i=1}^{k} \frac{(P_{dynamic\_i} + P_{static} + P_{switch} + P_{conduction})}{PCE_2} + \sum_{i=1}^{l} P_{OCVR,leakage} \right\}; j + k + l = N$$

Circuit simulations of a PDN designed to support the Iavg for each of the 16 cores are performed to determine the energy consumption as given by Equation 11. The 16 cores are simulated as piecewise constant current sinks. The current variation with time for the 16 current sinks is shown in FIG. 9(a). A 16×15 PMOS switching network may be implemented in a 45 nm technology. The gates of the PMOS switches may be controlled through time varying voltage signals. The Pswitch and Pconduction for the PMOS switch with an output capacitance provided by a single core is determined through SPICE simulations. The Pstatic and Pdynamic of a core is measured through McPAT. The Pdynamic for each core is overestimated as the power consumption per clock cycle is captured at the highest supported DVS level of 1 V. The parameter values of the switching network and the PDN are summarized in FIG. 11(a), Table 8.

The additional switching and conduction losses due to the PMOS switches are an insignificant fraction of the total power consumed by the CMP as both are only consumed when the PDN is reconfigured to combine the outputs of the OCVRs. The energy consumption of the proposed power delivery system is up to 44% less than the energy consumed by the CMP with over-provisioned OCVRs and PDN. On average, there is a 15% reduction in the energy consumption as shown through simulations of the proposed PDN with a stochastic load current modeled on the SPEC benchmark power traces shown in FIG. 7. By reducing the maximum rating of the OCVR (buck converter), the percentage reduction in the energy consumed for a core sinking current less than Iavg is 36%. The reduction in energy is due to the optimal PCE offered by the buck converter at the maximum output current supported. The energy efficiency of the CMP may therefore be improved by designing the power delivery system to support the average current demand of the cores. In addition, if a system level workload mapping technique is applied to distribute identical workloads on a cluster of cores, serving the core cluster with one OCVR that implements DVFS is advantageous to further reduce the energy consumption.

2.4.3 Technique to Prevent System Failure

The power consumption analysis of the different workloads provided in Section 2.2 and the construction of the PDN in Section 2.3 functions so that there is always an OCVR available in the CMP system to support core(s) demanding higher than the average current(s). In the unlikely event that an OCVR is not located to support the higher than average current requirement of a core, the core may be stalled by the PMU until an OCVR becomes available for clustering. The probability of not finding an OCVR for clustering is low when an efficient workload mapping technique is implemented. The performance penalty due to stalling the core is therefore negligible.

While the invention has been described with reference to the embodiments above, a person of ordinary skill in the art would understand that various changes or modifications may be made thereto without departing from the scope of the claims.

The invention claimed is:

1. A multi-core system, comprising:
multiple on-chip voltage regulators (OCVRs);
multiple cores;
a high speed switching (HSS) fabric connecting the multiple OCVRs to the multiple cores in order to provide current between the multiple OCVRs and the multiple cores when switches within the HSS fabric are closed;
a power management unit (PMU) that controls the HSS fabric; and
a task scheduler that distributes workloads for tasks on the multiple cores, wherein the multiple OCVRs' peak current output is equal to average current requirements of the multiple cores,
wherein the PMU reconfigures the switches between the multiple OCVRs and the multiple cores through the HSS fabric by combining output of the multiple OCVRs when a workload demand exceeds a peak current rating of a single OCVR, and
wherein the task scheduler assigns tasks to the multiple cores such that a total load current consumption of the multiple cores is less than a total current capability of under-current-provisioned OCVRs.

2. The multi-core system of claim 1, wherein the task scheduler comprises a demand side load management technique that imposes an acceptance test on each incoming task into the multi-core system.

3. The multi-core system of claim 1, wherein the task scheduler schedules each task onto one of the multiple cores on a condition that the task meets a power constraint of a power delivery system.

4. The multi-core system of claim 1, wherein the task scheduler comprises three procedures: a partition procedure, a dynamic voltage and frequency scaling (DVFS) procedure, and a schedule procedure.

5. The multi-core system of claim 4, wherein the partition procedure uses a Marginal Power Heuristic (M-PWR) that sorts tasks in decreasing order of task computation demand and assigns the tasks to one or more of the multiple cores such that each assignment leads to minimal increase in power consumption of each of the multiple cores.

6. The multi-core system of claim 4, wherein the DVFS procedure reduces an operating frequency and a voltage of the multiple cores by solving a bounded knapsack problem to constrain a total power consumption of all multiple cores within a power delivery capacity of the multiple OCVRs.

7. The multi-core system of claim 6, wherein a deadline of each task in a taskset is analogous to a value of an item in a knapsack.

8. The multi-core system of claim 6, wherein a required computational demand at a given frequency on a core is analogous to a weight of an item in a knapsack.

9. The multi-core system of claim 6, wherein an objective of the knapsack problem is to maximize a number of tasks executed on a core, without violating a task deadline.

10. The multi-core system of claim 1, wherein the task scheduler schedules the tasks on each core based on an earliest deadline first policy.

11. The multi-core system of claim 1, wherein high-speed switches are controlled by logic within the PMU that operate based on voltage levels and total load current sensed from each core.

12. The multi-core system of claim 1, wherein the task scheduler clusters output of the multiple OCVRs available in the multi-core system connected to multiple cores demand less than the peak current rating of a single OCVR and output voltage of combined OCVRs is matched before activating corresponding switches in the HSS fabric, wherein a run time clustering of outputs of the multiple OCVRs prevents system failure when a current demand of a core exceeds a maximum output current supported by the multiple OCVRs.

13. The multi-core system of claim 12, wherein the task scheduler declusters output of two or more OCVRs when the current demand of multiple cores served by a clustered OCVR decreases below a maximum output current rating of each OCVR.

14. The multi-core system of claim 1, wherein when a sum of currents sensed from all the multiple cores within a core cluster reaches a threshold below an average current (Iavg) consumed by one of the multiple cores, the PMU controls the HSS fabric to source additional current from other OCVRs which are located nearest to the core cluster and are sourcing current less than Iavg.

15. A multi-core power management method, the method comprising:
providing a task scheduler that distributes workloads for tasks on multiple cores, wherein multiple on-chip voltage regulators' (OCVRs') peak current output is equal to average current requirements of the multiple cores; and
providing real-time load-balancing that reconfigures switches between the multiple OCVRs and the multiple cores by combining output of the multiple OCVRs when a workload demand exceeds a peak current rating of a single OCVR,
wherein the task scheduler assigns tasks to the multiple cores such that a total load current consumption of the multiple cores is less than a total current capability of under-current-provisioned OCVRs.

* * * * *